United States Patent [19]

Martin et al.

[11] Patent Number: 5,703,147
[45] Date of Patent: Dec. 30, 1997

[54] EXTRUDABLE MICROPOROUS INSULATION

[75] Inventors: Phillip Charles Martin, Conifer; Monroe W. Shumate, Littleton, both of Colo.; William Michael Gregg, Bristol, Ind.

[73] Assignee: Schuller International, Inc., Denver, Colo.

[21] Appl. No.: 510,350

[22] Filed: Aug. 2, 1995

[51] Int. Cl.$^6$ ............... B32B 3/26; C08J 9/00; C08J 9/32

[52] U.S. Cl. ............ 523/212; 521/109.1; 521/142; 521/149; 521/182; 521/189; 523/213; 523/216; 523/218; 428/288; 428/304.4; 428/315.5; 428/317.1; 428/500

[58] Field of Search ............ 521/149, 142, 521/109.1, 182, 189; 428/288, 304.4, 315.5, 317.1, 500; 523/212, 213, 216, 218

[56] References Cited

U.S. PATENT DOCUMENTS 4,921,894  5/1990  Shumate .

*Primary Examiner*—John M. Cooney, Jr.
*Attorney, Agent, or Firm*—Cornelius P. Quinn

[57] ABSTRACT

A low density, high temperature resistant insulation material that is very thermally efficient, is easily moldable and is unaffected by water. The insulation material is especially suitable for use in aviation, aerospace and automotive applications. The insulation material contains inorganic fiber; inorganic binder; hydrophilic particulate inorganic material; hydrophobic particulate inorganic material; polymer; and preferably a setting agent and an opacifier.

20 Claims, No Drawings

EXTRUDABLE MICROPOROUS INSULATION

BACKGROUND OF THE INVENTION

This invention relates to a unique, low density, high temperature resistant insulation material and more particularly, it relates to an inorganic insulation material which has a very low thermal conductivity, is easily moldable and is unaffected by water.

Over the years, there has been an increasing need for high temperature resistant, very efficient, insulations in the aerospace, aviation, and automotive industries. These insulations are available in the form of MIN-K insulation, BTU BLOCK insulation, (both marketed by Schuller International, Inc.) and other microporous materials.

In the past, these materials have only been available in the form of dry materials that require significant efforts to form into desired shapes and extra precautions to keep the materials from becoming wet and thereby destroying their insulation value. For example, MIN-K microporous insulation has been used as the heat insulation and fire protection for the flight data and voice recorders for commercial aircraft. However, the MIN-K insulation is dry press molded and involves significant hand labor to finish.

A flexible, quilted cloth blanket stuffed with microporous insulation material is used to insulate various parts of aircraft engines and as thermal barriers in other aircraft and automotive applications. Special effort is needed to stitch the blanket to desired configurations; to provide mounting fixtures for the blanket; to prevent the dry microporous material from escaping from the finished blanket; and to prevent the material from absorbing water.

Therefor, there is a need in the industry for a low density, high temperature resistant, low thermal conductivity insulation material that is easy to fabricate to a desired shape that would not be affected by water.

U.S. Pat. No. 4,921,894; issued on May 1, 1990; to Monroe W. Shumate; and entitled "Novel, High Temperature Resistant Insulation" discloses a novel, high temperature resistant insulation material that is low in density; has a low thermal conductivity; and is easily moldable with low shrinkage. The disclosure of U.S. Pat. No. 4,921,894, is hereby incorporated herein in its entirety by reference.

SUMMARY OF THE INVENTION

The present invention is an improved extrudable microporous insulation material especially suited for aerospace, aviation and automotive applications. Unlike the novel, high temperature resistant insulation disclosed in U.S. Pat. No. 4,921,894, the extrudable microporous insulation material of the present invention is unaffected by water and is more thermally efficient than the novel, high temperature resistant insulation material disclosed in U.S. Pat. No. 4,921,894.

In one preferred embodiment of the present invention, the extrudable microporous insulation comprises about: (a) 18 wt % inorganic fiber; (b) 19 wt % inorganic binder; (c) 15 wt % hydrophilic particulate inorganic material; (d) 33 wt % hydrophobic particulate inorganic material; (e) 4 wt % polymer; (f) 1 wt % setting agent; and (g) 10 wt % opacifier.

The extrudable microporous insulation of the present invention is low in density, has a low thermal conductivity, is easily moldable, and is unaffected by water. Other features and aspects, as well as various additional benefits of the present invention will be made clear in the more detailed description of the invention which follows.

DESCRIPTION OF THE PREFERRED EMBODIMENTS

The extrudable microporous insulation of the present invention contains the following ingredients at the indicated weight percentage levels or ranges which are based upon the weight of the extrudable microporous material.

| INGREDIENTS | BROAD | PREFERRED |
| --- | --- | --- |
| Inorganic Fiber | 10–30 | 15–25 |
| Inorganic Binder | 15–35 | 18–22 |
| Hydrophilic Particulate Inorganic Mat. | 10–20 | 13–18 |
| Hydrophobic Particulate Inorganic Mat. | 25–50 | 30–40 |
| Polymer | 0.5–5 | 1–4 |
| Setting Agent | 0–6 | 0.5–4 |
| Opacifier | 0–20 | 7–15 |

In one preferred embodiment, the extrudable microporous insulation comprises about: (a) 18 wt % inorganic fiber; (b) 19 wt % inorganic binder; (c) 15 wt % hydrophilic particulate inorganic material; (d) 33 wt % hydrophobic particulate inorganic material; (e) 4 wt % polymer; (f) 1 wt % setting agent; and (g) 10 wt % opacifier.

The inorganic fiber can be a glass fiber, a mineral wool fiber, a ceramic fiber, a refractory fiber or the like or blends of these inorganic fibers. Preferably, the fiber utilized will have a temperature resistance of at least about 10000° F., and more preferably, a temperature resistance of at least about 18000° F. The inorganic fiber, rather than functioning primary as an insulation, provides mechanical strength to the extrudable microporous insulation material. Accordingly, it is preferred that the inorganic fiber be a low shot content fiber as this will allow amounts of fiber to be utilized down toward the lower end of the weight percentage range. One preferred blend of inorganic fibers comprises SF607 specialty vitreous fiber produced by Thermal Ceramics; CLIMATE PRO blowing wool produced by Schuller International Inc.; and chopped E-glass fiber strand.

Examples of inorganic binders which can be utilized include but are not limited to colloidal silica, ethyl silicate, ammonium phosphate, aluminum phosphate, colloidal alumina, zirconium acetate, and aluminum chloride. Colloidal silica is preferred because of its availability; its ability to adjust setting characteristics and/or control bond migration during product drying; and its compatibility with other organic additives.

The hydrophilic inorganic particulate material employed in the present invention acts both as a filler and a bulking agent (to absorb and retain water). As used herein, the term hydrophilic signifies the ability of the particulate material to do the latter. Examples of hydrophilic particulate material which can be utilized in the present invention include, but are not limited to, fumed silica, precipitated silica, micron size synthetic amorphous silica, and other fumed oxides.

The surface area of the hydrophilic inorganic particulate material will generally be greater than about 100 m²/g, and preferably, greater than about 150 m²/g.

The hydrophobic inorganic particulate material functions to make the extrudable microporous insulation microporous and thermally efficient. Examples of hydrophobic inorganic particulate materials which can be utilized in the present invention include, but are not limited to, fumed silica, precipitated silica, micron size synthetic amorphous silica and other fumed oxides which have been surface treated to make the materials hydrophobic. A preferred hydrophobic inorganic particulate material is fumed silica which has been surface treated with a material such as, dimethyl-silicone fluid, dimethyl-dichlorosilane or hexamethyl-disilane to make the fumed silica water resistant. Whereas, the insulation material of the '894 patent relied on the inorganic fibers as the insulation, the extrudable microporous insulation of the present invention utilizes the hydrophobic inorganic particulate material as the insulation and the inorganic fibers function primarily as a mechanical reinforcement for the extrudable insulation material.

Like the hydrophilic inorganic particulate material, the surface area of the hydrophobic inorganic particulate material will generally be greater than about 50 m$^2$/g, and preferably, greater than about 100 m$^2$/g.

At least one polymer selected from the group consisting of (a) polyalkylene oxides, (b) cellulose ethers, (c) polyalkylene glycols, and copolymers of vinyl amides and acrylic acids is employed in the present invention. Examples of the foregoing polymers which can be utilized in the present invention include, but are not limited to, polymers of ethylene oxide; propylene oxide; hydroxyethyl cellulose; hydroxymethyl cellulose; polyethylene glycol; acrylamide-acrylate copolymers; methylacrylamide-acrylate copolymers; and the like.

The organic polymer helps to provide good extrusion and molding characteristics for the mixture. It is believed that the organic polymer assists in water retention during formation of the insulation product; helps control drying shrinkage; and assists in the bonding of the extrudable microporous insulation to metal surfaces such as aluminum.

It is preferred that the inorganic binder and polymer employed in the present invention have maximum compatibility with one another. Thus, the inorganic binder employed in the extrudable microporous insulation should have as minimum a tendency as possible to degrade the particular polymer employed in the insulation.

Colloidal silica, the preferred binder of the present invention, has been found to be compatible with all three different types of polymers set forth above. However, it is preferred to use colloidal silica with ethylene oxide. Alkylene oxides have been found to be particularly compatible with ethyl silicate and colloidal aluminum. Cellulose ethers have been found to be particularly compatible with aluminum phosphate, ammonium phosphate, zirconium acetate, and aluminum oxide.

While the inorganic binder may be set by any suitable method known to those skilled in the art. Generally, the mechanism to set the binder will be by gelation using either an organic, e.g. cationic starch, or an inorganic setting agent. In a preferred embodiment, which uses an acid stabilized colloidal silica as the inorganic binder, the binder is gelled by the addition of a second base stabilized colloidal silica that causes both the binder and the setting agent to form a gel. The resultant mixture is readily extrudable and easily moldable.

It may also be preferable to employ an opacifier in the extrudable microporous insulation of the present invention where enhanced thermal conductivity properties are desired. Examples of suitable opacifying agents include silicon carbide, titania, and magnesium oxide.

Preferably, the extrudable microporous insulation of the present invention is made by preparing a dry mixture of hydrophilic particulate inorganic material (part of the total employed in the insulation) and the polymer. This mixture is added to the inorganic binder, diluted with water, and mixed in a mixer, such as a HOBART mixer. The setting agent, diluted with water, is added to the mixture in the mixer to gel the inorganic binder. The resulting gel has a consistency like molasses. A dry mixture of the inorganic fiber, the remainder of the hydrophilic particulate inorganic material, the hydrophobic particulate inorganic material, and opacifier is prepared and added to the gelled inorganic binder mixture in the mixer. The entire mixture is then mixed and blended until a homogeneous extrudable mixture is obtained. The extrudable or moldable mixture has a solids content ranging from 15 to 40% and preferably, from 20 to 35%. The homogeneous mixture is then formed, molded or extruded into the desired shape and dried to form the finished microporous insulation product.

Generally the extrudable microporous insulation has a density between 8 and 20 pcf and preferably, between 10 and 16 pcf.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An extrudable microporous insulation material comprising about:
    (a) 10–30 wt % inorganic reinforcement fiber;
    (b) 15–35 wt % inorganic binder;
    (c) 10–20 wt % hydrophilic fumed particulate filler and bulking material;
    (d) 25–50 wt % fumed particulate insulation material which has been surface treated to make the material hydrophobic;
    (e) 0.5–5 wt % polymer;
    (f) 0–6 wt % setting agent; and
    (g) 0–20 wt % opacifier.

2. An extrudable microporous insulation material according to claim 1 wherein: said hydrophilic fumed particulate material has a surface area greater than about 100 m$^2$/g and said hydrophobic fumed particulate material has a surface area greater than about 50 m$^2$/g.

3. An extrudable microporous insulation material according to claim 1 wherein: said inorganic binder is an acid stabilized colloidal silica and said setting agent is a base stabilized colloidal silica.

4. An extrudable microporous insulation material according to claim 1 wherein: said polymer is at least one polymer selected from the group consisting of polyalkylene oxides; cellulose ethers; polyalkylene glycols; and copolymers of vinyl amides and acrylic acids.

5. An extrudable microporous insulation material according to claim 1, wherein: said polymer is a polyalkylene glycol.

6. An extrudable microporous insulation material according to claim 5 wherein: said polyalkylene glycol is polyethylene glycol.

7. An extrudable microporous insulation material according to claim 1 wherein said polymer is a copolymer of vinyl amides and acrylic acids.

8. An extrudable microporous insulation material according to claim 1 wherein: said polymer is an acrylamide-acrylate copolymer.

9. An extrudable microporous insulation material according to claim 1 having a density ranging from about 8 to about 20 p.c.f.

10. An extrudable microporous insulation material according to claim 1 having a density ranging from about 10 to about 16 p.c.f.

11. An extrudable microporous insulation material according to claim 1, wherein: said hydrophilic fumed particulate material is fumed silica; and said hydrophobic fumed particulate material is fumed silica surface treated with dimethyl silicone fluid, dimethyl-dichorosilane, or hexamethyl-disilane to make the material hydrophobic.

12. An extrudable microporous insulation material according to claim 1 comprising about:

(a) 15–25 wt % inorganic fiber;
(b) 18–22 wt % inorganic binder;
(c) 13–18 wt % hydrophilic fumed particulate inorganic material;
(d) 30–40 wt % hydrophobic fumed particulate inorganic material;
(e) 1–4 wt % polymer;
(f) 0.5–4 wt % setting agent; and
(g) 7–15 wt % opacifier.

13. An extrudable microporous insulation material according to claim 12 wherein: said hydrophilic fumed particulate inorganic material has a surface area greater than about 100 m$^2$/g and said hydrophobic fumed particulate inorganic material has a surface area greater than about 50 m$^2$/g.

14. An extrudable microporous insulation material according to claim 13, wherein: said hydrophilic fumed particulate material is fumed silica; and said hydrophobic fumed particulate inorganic material is fumed silica surface treated with dimethyl silicone fluid, dimethyl-dichorosilane, or hexamethyl-disilane to make the material hydrophobic.

15. An extrudable microporous insulation material according to claim 12 wherein: said inorganic binder is an acid stabilized colloidal silica and said setting agent is a base stabilized colloidal silica.

16. An extrudable microporous insulation material according to claim 12 wherein: said polymer is at least one polymer selected from the group consisting of polyalkylene oxides; cellulose ethers; polyalkylene glycols; and copolymers of vinyl amides and acrylic acids.

17. An extrudable microporous insulation material comprising about:

(a) 18 wt % inorganic reinforcement fiber;
(b) 19 wt % inorganic binder;
(c) 15 wt % hydrophilic particulate inorganic filler and bulking material;
(d) 33 wt % particulate inorganic insulation material which has been surface treated to make the material hydrophobic;
(e) 4 wt % polymer;
(f) 1 wt % setting agent; and
(g) 10 wt % opacifier.

18. An extrudable microporous insulation material according to claim 17 wherein: said hydrophilic fumed particulate material has a surface area greater than about 100 m$^2$/g and said hydrophobic fumed particulate material has a surface area greater than about 50 m$^2$/g.

19. An extrudable microporous insulation material according to claim 17 wherein: said inorganic binder is an acid stabilized colloidal silica and said setting agent is a base stabilized colloidal silica.

20. An extrudable microporous insulation material according to claim 17 wherein: said polymer is at least one polymer selected from the group consisting of polyalkylene oxides; cellulose ethers; polyalkylene glycols; and copolymers of vinyl amides and acrylic acids.

* * * * *